UNITED STATES PATENT OFFICE.

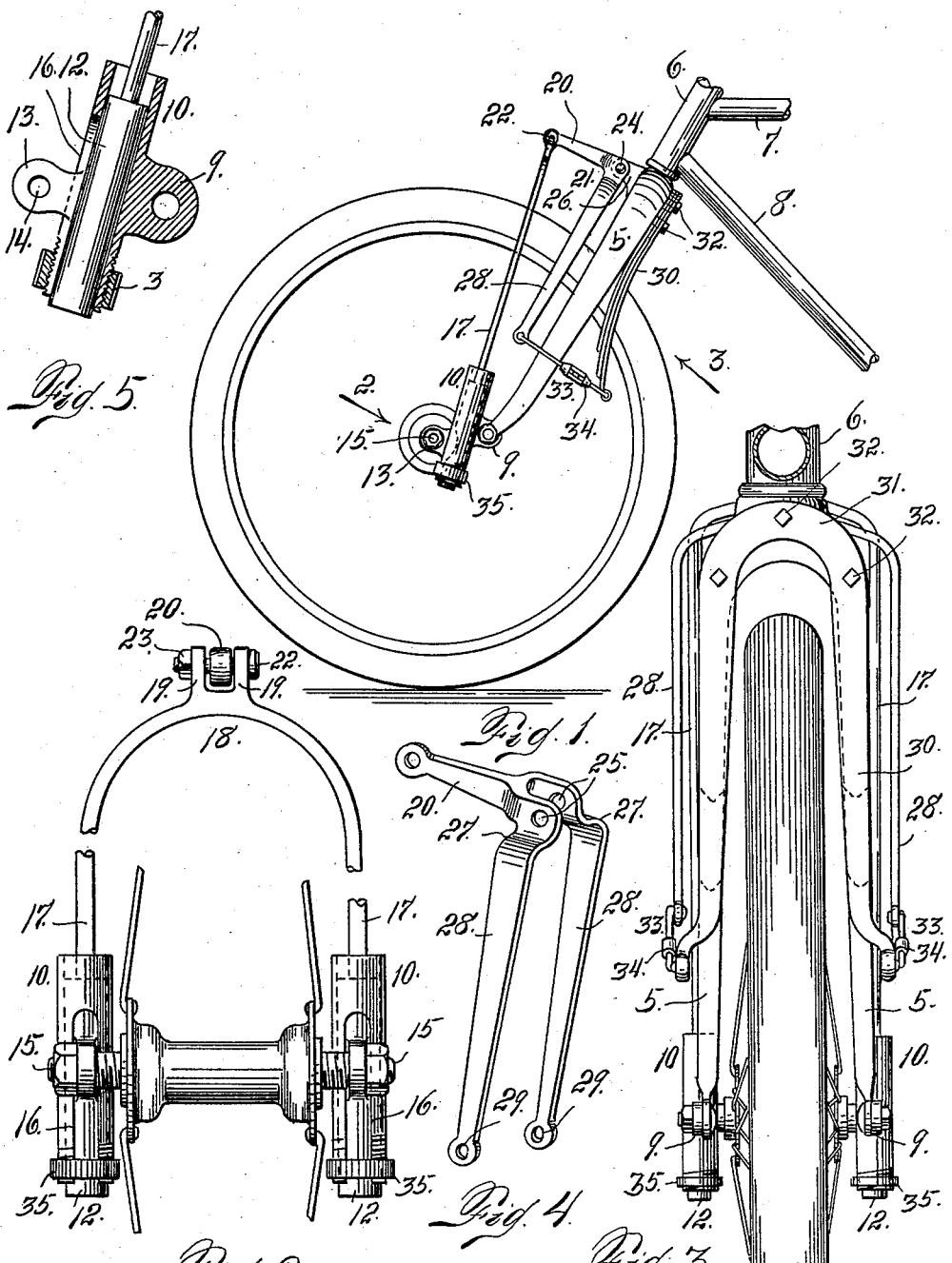

CHARLES G. STEPHENSON, OF DENVER, COLORADO.

SPRING FRONT FORK FOR MOTOR-CYCLES.

1,082,775.

Specification of Letters Patent. Patented Dec. 30, 1913.

Application filed September 30, 1912. Serial No. 723,081.

*To all whom it may concern:*

Be it known that I, CHARLES G. STEPHENSON, a citizen of the United States, residing in the city and county of Denver and State of Colorado, have invented certain new and useful Improvements in Spring Front Forks for Motor-Cycles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in spring frames for motorcycles, the same being adapted for use on bicycles or other similar velocipedes.

The improvement is particularly desirable for use on motorcycles owing to the necessity for an elastic element in the frame-work of these machines, since in the absence of such an element the vibration subjects the rider to excessive jar, whereby it becomes not only exceedingly disagreeable but is also injurious to health.

My present improvement relates to spring mechanism employed in connection with the front fork of the machine interposing a cushion element between the wheel and the fork. The lower extremities of the arms of the front fork are connected with cylindrical casings in which are located plungers equipped with lugs passing through slots in the casings, the opposite extremities of the axle of the front wheel being connected with the said lugs. An auxiliary fork is provided with arms whose lower extremities are connected with the said plungers, the upper extremities of the auxiliary fork being pivotally connected with one arm of a bell-crank lever device fulcrumed at its angle on a rigid projection formed at the upper extremity of the front fork of the machine. The lower extremities of the two parts of the bell-crank lever member are connected by means of rods with the lower extremities of the arms of a forked spring, the upper extremity of the said spring being secured to the upper end of the front fork. By virtue of this construction, the elasticity, or cushion, between the wheel and the fork is regulated by the tension of the said spring, the rods connecting the bell-crank lever with the spring being divided, and connected by turn-buckles for purposes of adjustment, whereby the tension of the spring is regulated.

Having briefly outlined my improved construction, I will proceed to describe the same in detail, reference being made to the accompanying drawing, in which is illustrated an embodiment thereof.

In this drawing: Figure 1 is a side elevation of the front wheel of a motorcycle shown in connection with its fork and a portion of the frame-work, the greater part of the latter being broken away. Fig. 2 is a fragmentary front detail view of the structure looking in the direction of arrow 2, Fig. 1, the parts being shown on a larger scale. Fig. 3 is a rear view of the construction looking in the direction of arrow 3, Fig. 1, shown on a larger scale. Fig. 4 is a perspective view of a bell-crank lever device forming a part of my improvement. Fig. 5 is a sectional view taken through one of the cylindrical casings with which the arms of the front fork are connected, the plunger therein being shown in elevation.

The same reference characters indicate the same parts in all the views.

Let the numeral 5 designate the front fork of a motorcycle shown in connection with the steering-head 6, with which frame members 7 and 8 are connected in the usual manner. The lower extremities of the fork arms are pivotally connected with lugs 9 formed on cylindrical casings 10 in which are located plungers 12 provided with lugs 13 having perforations 14 to receive a bolt 15 whereby the opposite extremities of the axle of the front wheel are connected with the plungers 12. The lugs 13 pass through slots 16 formed in the casings 10, the said slots being of sufficient length to permit the necessary movement between the plungers and casings to give the desired yielding capacity to the structure.

Connected with the plungers 12 are two arms 17 of an auxiliary fork 18 which is provided at the top of the arch with separated lugs 19, between which the forward extremity of an arm 20 of a bell-crank lever 21 is passed. This arm 20, as well as the lugs 19, is perforated to receive a connecting bolt 22 held in place by a nut 23. It will be understood that the arms 17 of the auxiliary fork occupy positions on opposite sides of the wheel, the arch of the fork extending above the wheel a considerable distance for the purpose. The bell-crank lever device 21 is fulcrumed, as shown at 24, the fulcrum pin passing through perforations 25 formed at the angle of the lever, and a registering perforation formed in a lug 26 located at the arch of the front fork 5 and secured thereto, or formed integral therewith. From the fulcrum pin of this lever the upper extremities of the depending member of the lever branch outwardly, as shown at 27, and merge into arms 28 whose lower extremities are provided with perforations 29. The lower extremities of these arms 28 are connected by rods 33 with the lower extremities of two members 30 of a spring 31, the said spring being arch-shaped and its upper extremity being connected with the arch of the fork 5 by means of bolts 32, or other suitable fastening devices. These rods 33 are each composed of two parts connected by a turn-buckle 34 whereby the tension of the spring may be regulated.

From the foregoing description, the use and operation of my present improvement will be readily understood.

As weight is applied to the frame-work of the machine during the use of the same in the usual way, there will be a tendency to force the front wheel upwardly, considering the movement of the wheel in relation to the front fork and the cylindrical casings 10. This movement of the wheel will impart an upward thrust to the arms 17 of the auxiliary fork, which thrust will act upon the arm 20 of the bell-crank lever device 21, whereby the arms 28 of the other member of the lever device will be thrust forwardly and subject the lower extremities of the arms 30 of the spring to forward movement. It will thus be seen that the degree of movement between the wheel and the casings 10 will be regulated by the tension of the arms 30 of the spring 31.

Having thus described my invention, what I claim is:

1. The combination with two members comprising a fork and a wheel of the machine, of coöperating parts comprising plungers connected with one member and plunger guides connected with the other member, a spring mounted on the fork and an operative connection between the spring and the coöperating parts with which the wheel is connected, substantially as described.

2. The combination with a wheel and a fork of the machine, of plungers connected with the wheel on opposite sides of said wheel, plunger guides connected with the respective fork arms, a spring mounted on the fork and an operative connection between the said spring and the said plungers, substantially as described.

3. The combination with a wheel and a fork of the machine, of plungers connected with the opposite extremities of the wheel axle, plunger guides connected with the respective fork arms and in which the plungers are slidable, spring arms mounted on the fork and extending downwardly on opposite sides of the wheel, and an operative connection between the spring arms and the said plungers.

4. The combination with a wheel and a fork of the machine, of plungers connected with the opposite extremities of the wheel axle, plunger guides connected with the respective fork arms and in which the plungers are slidable, spring arms mounted on the fork and extending downwardly on opposite sides of the wheel, an auxiliary fork whose arms are respectively connected with the plungers, and a bell-crank lever fulcrumed on the main fork and having one arm connected with the auxiliary fork and the other arm connected with the said spring arms.

5. The combination with a wheel and a fork of the machine, of plungers secured to the opposite extremities of the wheel axle, open cylinders pivotally connected with the lower extremities of the opposite arms of the fork and in which the plungers slide freely, an auxiliary fork whose arms are connected at their lower extremities to the said plungers, a bell-crank lever fulcrumed on the main fork and having one of its arms pivotally connected with the top of the auxiliary fork, its opposite arm being composed of two members depending on opposite sides of the wheel, a laminated yoke-shaped leaf-spring secured to the main fork and having arms depending on opposite sides of the wheel, and extensible rods connecting the lower extremities of the auxiliary fork arms with the lower extremities of the spring arms.

In testimony whereof I affix my signature in presence of two witnesses.

CHARLES G. STEPHENSON.

Witnesses:
 Eva L. Hall,
 May Clements.

---

Copies of this patent may be obtained for five cents each, by addressing the "Commissioner of Patents, Washington, D. C."